US006845862B2

(12) United States Patent
Southwick et al.

(10) Patent No.: US 6,845,862 B2
(45) Date of Patent: Jan. 25, 2005

(54) PORTABLE SAWMILL CONVEYOR SYSTEM

(75) Inventors: Mark P. Southwick, 48 Davis St., Phoenix, NY (US) 13135; Paul M. Southwick, Red Creek, NY (US)

(73) Assignee: Mark P. Southwick, Frostburg, MD (US)

( * ) Notice: Subject to any disclaimer, the term of this patent is extended or adjusted under 35 U.S.C. 154(b) by 9 days.

(21) Appl. No.: 10/405,002

(22) Filed: Mar. 31, 2003

(65) Prior Publication Data

US 2004/0188225 A1 Sep. 30, 2004

(51) Int. Cl.[7] .......................... B65G 13/00; B65G 37/00
(52) U.S. Cl. ....................................... 198/539; 198/580
(58) Field of Search ................................ 198/539, 580, 198/771

(56) References Cited

U.S. PATENT DOCUMENTS

| | | | | |
|---|---|---|---|---|
| 4,822,447 A | * | 4/1989 | Obermeier | 198/580 |
| 5,314,055 A | * | 5/1994 | Gordon | 198/395 |
| 5,687,831 A | * | 11/1997 | Carlisle | 198/395 |
| 6,116,409 A | * | 9/2000 | Yokajty et al. | 198/771 |
| 6,315,103 B1 | * | 11/2001 | Boucherie | 198/395 |

* cited by examiner

*Primary Examiner*—Gene O. Crawford
(74) *Attorney, Agent, or Firm*—Christopher R. Pastel; Hancock & Estabrook, LLP

(57) ABSTRACT

A conveyor system for use in combination with a portable sawmill that generally includes an upper frame assembly, a lower frame assembly, an outgoing belt mounted on the upper frame assembly, and an incoming belt mounted on the lower frame assembly. A motor and gear assembly operably coupled to the outgoing and incoming belts drive them in opposing directions. A portable sawmill blade may be positioned in spaced relation above the outgoing belt to cut wooden cants into individual boards, and the lower frame assembly is adapted to carry the remaining cant and processed board back towards an operator station.

12 Claims, 3 Drawing Sheets

PORTABLE SAWMILL CONVEYOR SYSTEM

BACKGROUND OF THE INVENTION

The present invention relates generally to wood processing devices, and more particularly to such devices used to process cants into individual boards using a portable sawmill.

The process of forming individual wooden boards used principally in the construction of structures includes the basic steps of harvesting wood by cutting down trees, processing the cut tree by stripping the bark therefrom and cutting the rounded periphery of the tree into a square or rectangular cross-section (referred to in the industry as a "cant"), and using a device known as a sawmill to slice the cant into individual boards of predetermined thickness.

Large scale wood processing operations generally include permanently installed fixtures for processing the wood, typically in the form of a system of conveyors for carrying wood and various kinds of saws for cutting the wood into desired thicknesses and lengths. These assemblies are quite efficient at processing the wood, but are also quite expensive. However, while such assemblies are useful for operations that continuously process wood in the same location, they are not portable.

Small scale wood processing operations cannot typically afford the processing assemblies found in large scale operations. These operations generally include a portable sawmill due to their low cost and flexibility in processing many types of lumber. However, one type of lumber that a portable sawmill is not efficient at processing is lumber produced from a can. One solution to this specific problem is a device that be loaded on the bed of the portable sawmill which grips the cant and feeds it through the saw blade. The portable sawmill and this delivery system are functional for small scale wood processors, but are still relatively inefficient at processing cants as the operator has to load a cant on the conveyor, walk alongside the conveyor while the sawmill cuts the cant, unload the produced board and remainder of the cant at the opposite end of the conveyor, and then carry the cant back to the front of the device for further processing.

It is therefore a principal object and advantage of the present invention to provide a conveyor system that may be used in combination with a portable sawmill that improves wood processing efficiency over the state of the art.

It is another object and advantage of the present invention to provide a conveyor system that is inexpensively manufactured and affordable to typical small scale wood processing operations.

Other objects and advantages of the present invention will in part be obvious, and in part appear hereinafter.

SUMMARY OF THE INVENTION

In accordance with the foregoing objects and advantages, the present invention provides a conveying device for processing cants using a portable sawmill that generally comprises an upper frame assembly having proximal and distal ends, and extending along a first longitudinal axis, and including a first belt mounted thereon including an upper surface that extends in a first plane; a lower frame assembly having proximal and distal ends, and extending along a second longitudinal axis that is spaced from and parallel to the first longitudinal axis, and including a second belt mounted thereon including an upper surface that extends in a second plane parallel to and vertically spaced from the first plane; and a drive system comprising a motor and a gear assembly (or otehr conventional drive system) operably coupled to the first belt for imparting movement in a first direction thereto and to the second belt for imparting movement in a second direction, opposite to the first direction, thereto. A knock-down is attached to the upper frame assembly adjacent the distal end thereof for pushing the processed board and cant from the upper frame assembly to the lower frame assembly. In addition, a cant clamping device is attached to the upper frame assembly in spaced relation above the first belt, adjacent its proximal end, and is movable into engaged relation with the upper surface of the cant being processed.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
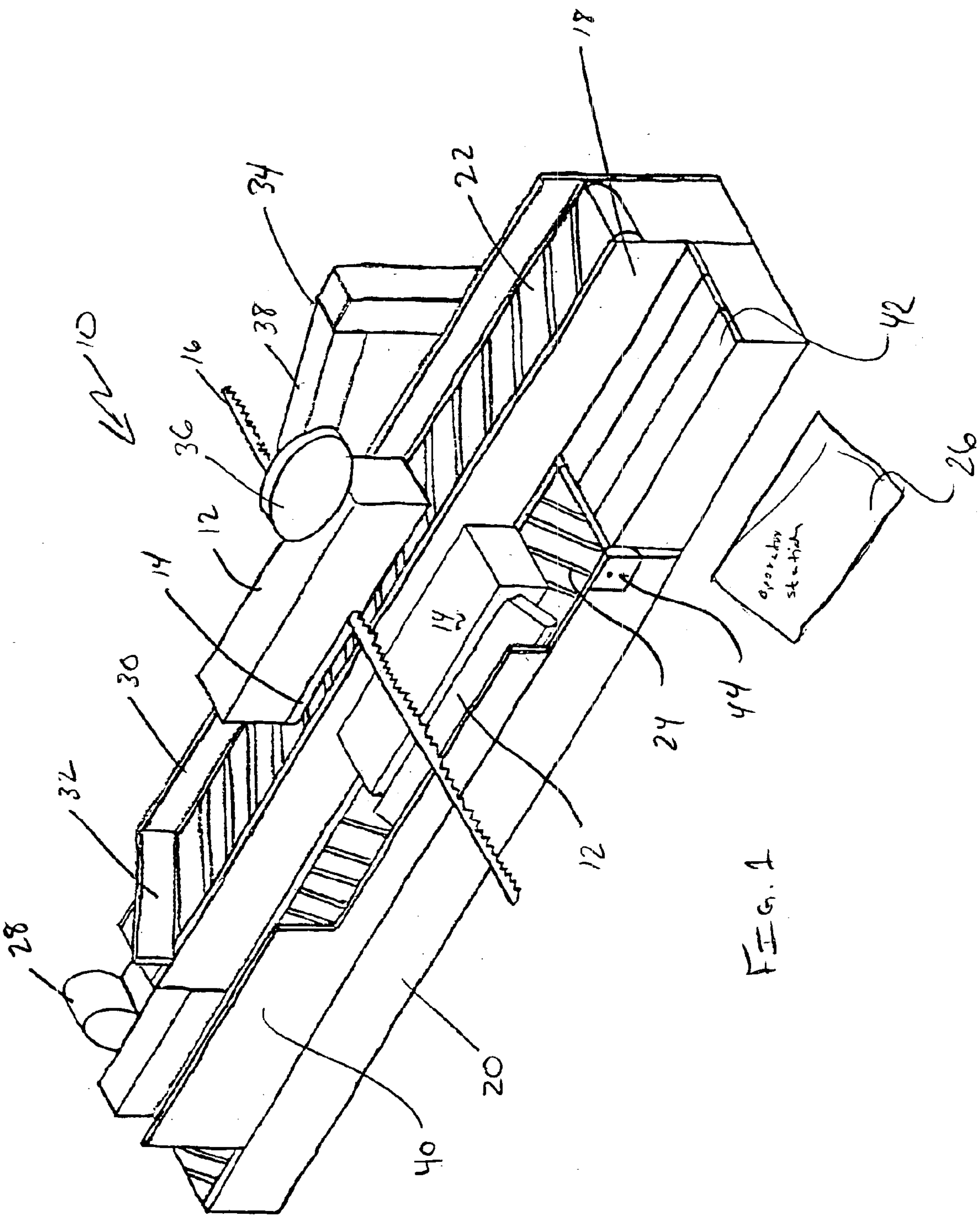
FIG. 1 is a perspective view of the present invention.
Figure 2:
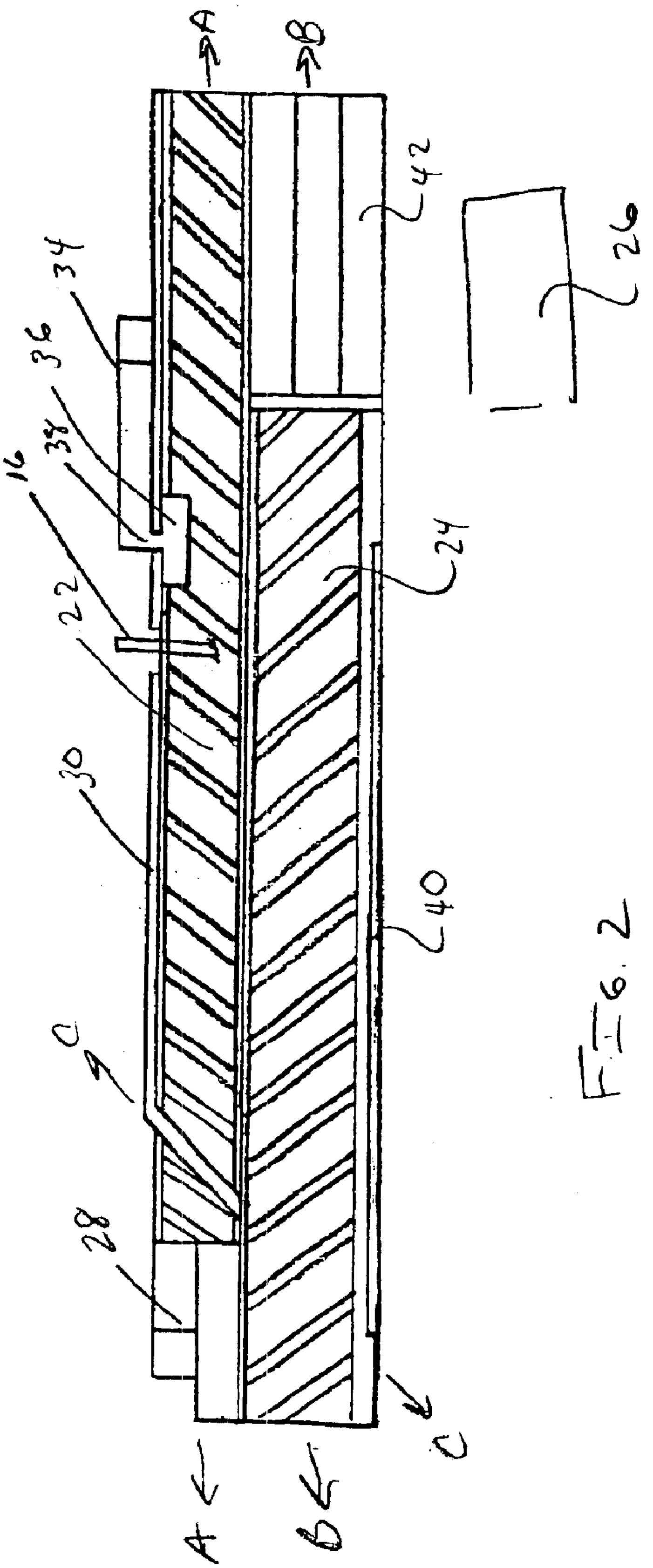
FIG. 2 is a top plan view thereof.
Figure 3:
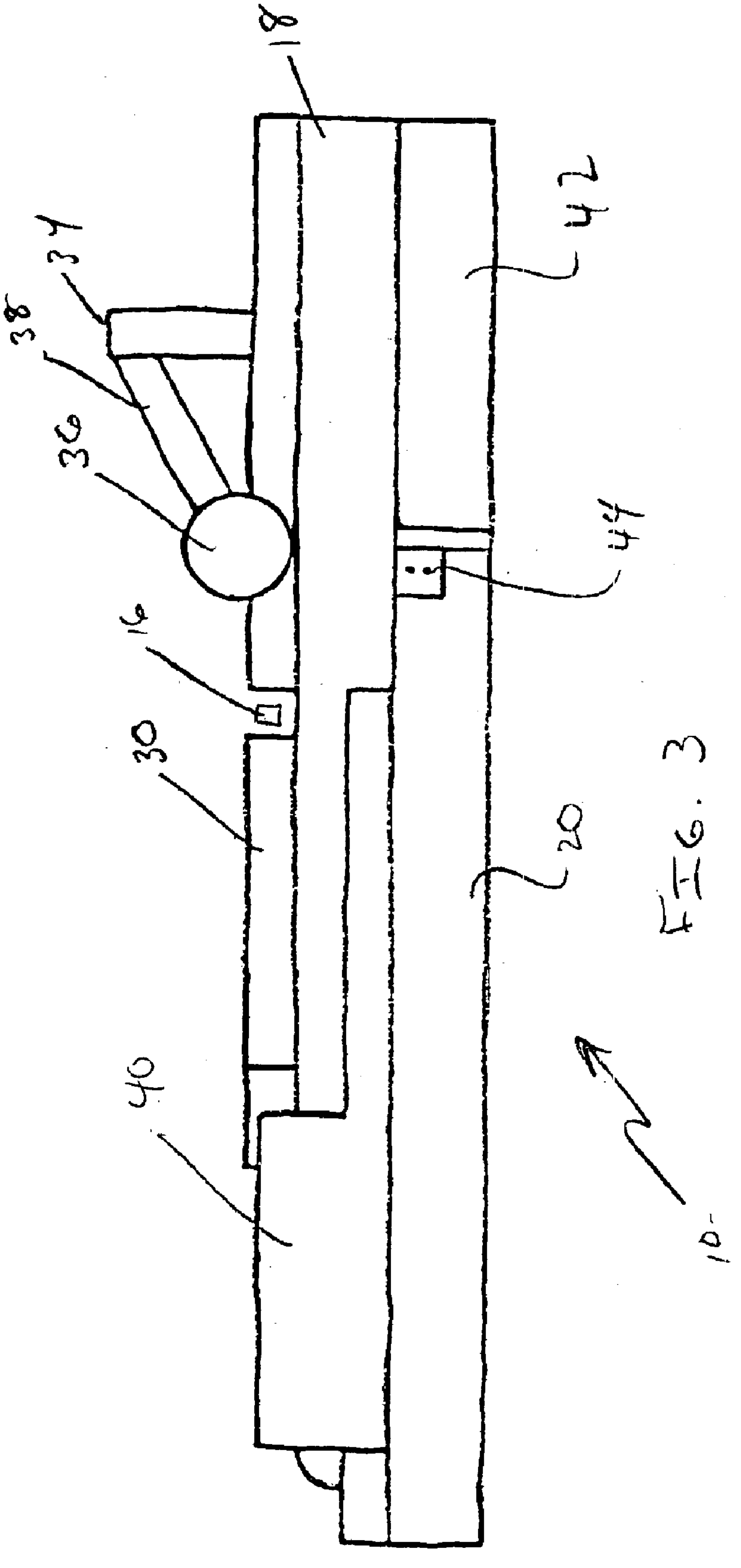
FIG. 3 is a side elevation view thereof.

Referring now to the drawings, wherein like reference numerals refer to like parts throughout, there is seen in FIG. 1, a conveying device, designated generally by reference numeral 10, for processing a cant 12 into individual, thinner boards 14 using a conventional, portable sawmill. Cant 12 is a conventional piece of square or rectangular cross-section wood from which slices of generally uniform thickness are cut by a portable sawmill having a blade 16, thereby creating boards 14. Only blade 16 is illustrated in the drawing figures as portable sawmills are well understood in the art, and one that could be used in conjunction with the accompanying invention is disclosed in U.S. Pat No. 4,559,858.

Conveying device 10 generally comprises an upper frame assembly 18 extending along longitudinal axis A—A, a lower frame assembly 20 extending along longitudinal axis B—B that is parallel to axis A—A, an outgoing conveyor belt 22 mounted on upper frame assembly 20 that includes an upper surface extending in a horizontal plane, and an incoming conveyor belt 24 mounted on lower frame assembly 20 and that includes an upper surface that extends in a horizontal plane vertically spaced below outgoing conveyor belt 22. Each belt 22 and 24 includes proximal ends where a cant is loaded for processing, and removed for further processing, and opposite distal ends. An operator station 26 is positioned adjacent belt 24 so that an operator can easily pull cut boards 14 and the remainder of a cant 12 off of belt 24, and place the cant back on belt 22 for further processing.

A motor and gear box assembly 28 is operably coupled to belts 22 and 24 so as to drive belt 22 in a first direction, and drive belt 24 in a second direction opposite the first direction. It should be understood that separate motors and drive shafts could be used to drive belts 22, 24 independently.

Upper frame assembly 18 further comprises a sidewall 30 that extends in a plane perpendicular to belt 22, and is positioned adjacent the outside edge of belt 22. Sidewall 30 prevents cant 12 from falling off of belt 22 when moving there along. A cant knock-down 32 is attached to sidewall 30 (or otherwise attached to upper frame assembly 18) and extends along a longitudinal axis C—C that is at an oblique angle to longitudinal axis A—A (preferably forming an internal obtuse angle with sidewall 30 to most effectively facilitate movement of cant 12 and board 14 to lower frame assembly 20, as will be explained in greater detail hereinafter.

Finally, a cant clamp 34 is also connected to upper frame assembly 18. Cant clamp 34 comprises a wheel 36 rotatably mounted to a shaft 38 that interconnects it to upper frame assembly 18. Wheel 36 falls into contacting relation with the upwardly facing surface of cant 12 as it travels along belt 22, thereby serving as a clamp that assists in maintaining cant 12 in a stable position as portable sawmill blade 16 passes through it (sawmill blade 16, as explained hereinafter, is preferably positioned adjacent to the distal side of wheel 36).

Lower frame assembly 20 further comprises a sidewall 40 that extends in a plane perpendicular to belt 24, and is positioned adjacent the outer edge of belt 24. Sidewall 40 prevents cant 12 and board 14 from falling off of belt 24 as they fall from upper frame assembly 18.

A table 42 is positioned adjacent to and in vertically spaced relation below the proximal end of belt 24, and adjacent operator station 26.

In operation, a portable sawmill blade 16 is be positioned over belt 22 at a fixed distance above belt 22 (the fixed distance being the thickness of the boards being cut from cant 12). An operator positioned at operator station 26 would turn the switch 44 to motor 28 "on", and place a cant 12 lengthwise on belt 22. The cant 12 then travels along belt 22, being held down by wheel 36, and having a board 14 cut therefrom by sawmill 16. After fully passing through sawmill 16, cant 12 (and board 14) come into contact with knock-down 32 which directs them off of upper frame assembly 18, down to lower frame assembly 20. Sidewall 40 prevents cant 12 and board 14 from falling off of lower frame assembly 20, and belt 24 carries them back towards the operator. Pallet 42 catches cant 12 and board 14 as they fall from belt 24, and the operator can then reload the cant onto belt 22 for additional processing, and organize boards 14 on table 42 while cant 12 is being processed.

What is claimed:

1. A conveying device for processing cants using a portable sawmill, said device comprising:

a. an upper frame assembly having proximal and distal ends, and extending along a first longitudinal axis, and including a first belt mounted thereon including an upper surface that extends in a first plane;

b. a lower frame assembly having proximal and distal ends, and extending along a second longitudinal axis that is spaced from and parallel to said first longitudinal axis, and including a second belt mounted thereon including an upper surface that extends in a second plane parallel to and vertically spaced from said first plane;

c. a drive system comprising a motor and a gear assembly operably coupled to said first belt for imparting movement in a first direction thereto and to said second belt for imparting movement in a second direction, opposite to said first direction, thereto; and d. a cant clamp interconnected to said first frame assembly;

wherein said first frame assembly comprises a first sidewall that extends in a third plane perpendicular to said first plane.

2. The conveying device according to claim 1, further comprising a knock-down device positioned in a vertically spaced relation above said belt and extending along a third longitudinal axis that obliquely intersects said first longitudinal axis.

3. The conveying device according to claim 1, wherein said second frame assembly comprises a second sidewall that extends in a fourth plane spaced from and parallel to said third plane.

4. The conveying device according to claim 1, wherein said cant clamp comprises a wheel adopted to rotate when positioned in contacting relation to a cant moving on said first belt in said first direction.

5. The conveying device according to claim 1, further comprising a table positioned adjacent said proximal end of said lower frame assembly and in lower vertically spaced relation thereto.

6. A conveying device for processing cants using a portable sawmill, said device comprising:

a. an upper frame assembly having proximal and distal ends, and extending along a first longitudinal axis, and including a first belt mounted thereon including an upper surface that extends in a first plane;

b. a lower frame assembly having proximal and distal ends, and extending along a second longitudinal axis that is spaced from and parallel to said first longitudinal axis, and including a second belt mounted thereon including an upper surface that extends in a second plane parallel to and vertically spaced from said first plane;

c. means for moving said first belt in a first direction;

d. means for moving said second belt in a second direction, opposite of said first direction; and e. a cant clamp interconnected to said first frame assembly;

wherein said first frame assembly comprises a first sidewall that extends in a third plane perpendicular to said first plane.

7. The conveying device according to claim 6, further comprising a knock-down device positioned in a vertically spaced relation above said belt and extending along a third longitudinal axis that obliquely intersects said first longitudinal axis.

8. The conveying device according to claim 6, wherein said second frame assembly comprises a second sidewall that extends in a fourth plane spaced from and parallel to said third plane.

9. The conveying device according to claim 6, wherein said cant clamp comprises a wheel adopted to rotate when positioned in contacting relation to a cant moving on said first belt in said first direction.

10. The conveying device according to claim 6, further comprising a table positioned adjacent said proximal end of said lower frame assembly and in lower vertically spaced relation thereto.

11. The conveying device according to claim 6, wherein said means for moving said first belt in a first direction comprises a motor and gear assembly operably coupled to said first belt.

12. The conveying device according to claim 6, wherein said means for moving said second belt in a second direction comprises a motor and gear assembly cooperatively coupled to said second belt.

* * * * *